Figure 1:
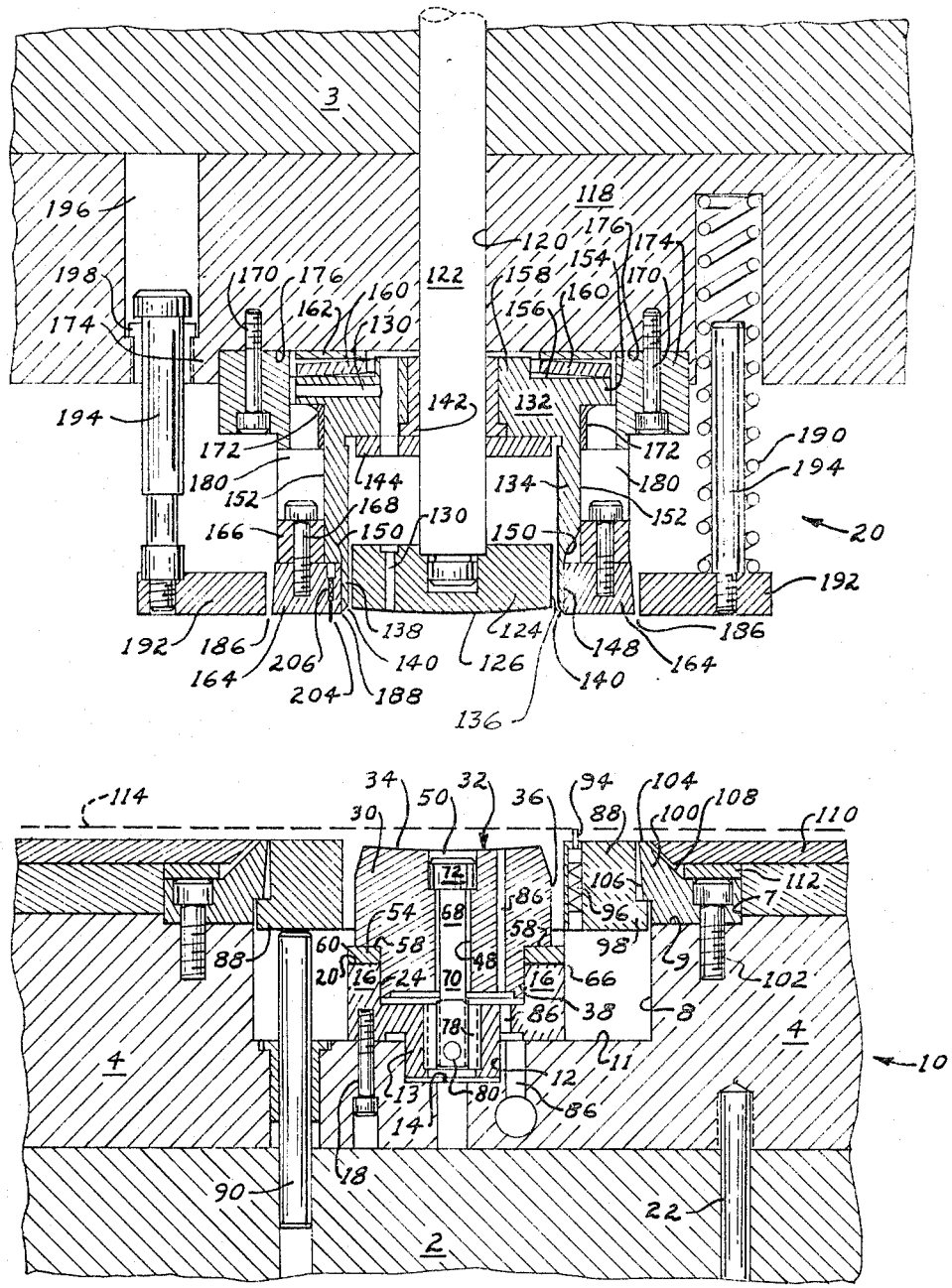

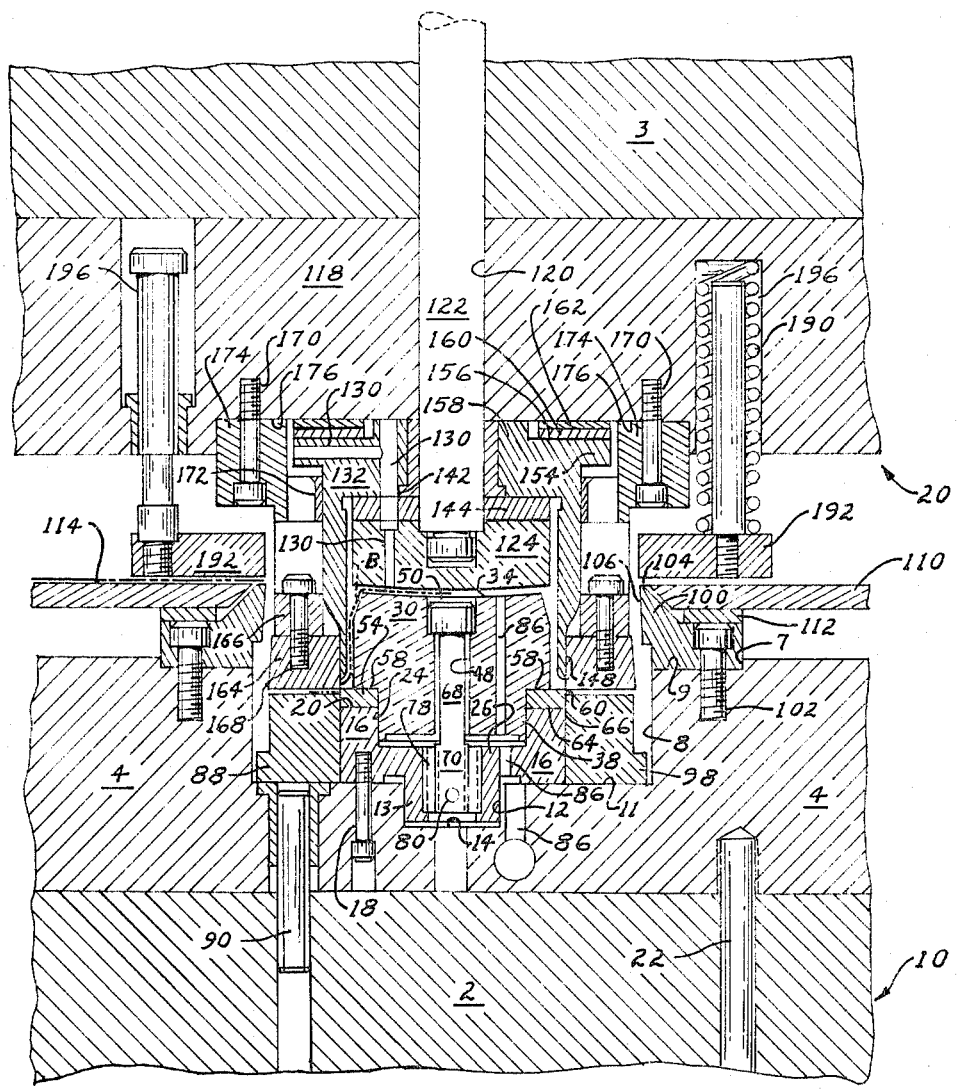

United States Patent Office 3,274,818
Patented Sept. 27, 1966

3,274,818
APPARATUS FOR FORMING ARTICLES
Henry G. Henrickson, Oakland, Calif., assignor to Kaiser Aluminum & Chemical Corporation, Oakland, Calif., a corporation of Delaware
Filed Nov. 4, 1963, Ser. No. 321,170
9 Claims. (Cl. 72—336)

This invention relates to the fabrication of a cup-shaped article from a flat blank. More particularly, the invention is concerned with providing a punch and die apparatus for fabricating such articles during a single operating stroke of the apparatus. The instant apparatus also constitutes an improvement over the punch and die apparatus disclosed in my prior Patent 2,985,128 issued May 23, 1961.

Accordingly, it is a primary object of the present invention to provide an improved punch and die apparatus for fabricating a cup-shaped article from a flat blank in a single operating stroke of the apparatus. The manner of accomplishing this and the other objects of the instant invention not specifically alluded to but inherent therein will become apparent when consideration is given to the appended drawings and the following detailed description wherein:

FIG. 1 is a sectional view of the novel punch and die apparatus of the instant invention with certain parts removed and other parts cut away for the sake of clarity and shows the various components of the apparatus in an "open" or "at rest" position, a strip or web of material, such as a strip of a suitable aluminum or aluminum alloy, having been advanced by suitable means (not shown) to a location between the stationary die assembly and the movable die assembly;

FIG. 2 is a sectional view similar to FIG. 1 with some parts removed and other parts cut away for the sake of clarity and shows the relative positions of the various components of the apparatus as they would appear at the end of the operating stroke of the apparatus, and with a cup-shaped article having been formed thereby.

Referring now to the various figures of the drawings, it will be seen that the apparatus generally comprises a lower or stationary die assembly 10 and an upper or movable die assembly 20. The stationary die assembly 10 is generally associated with a stationary press bolster 2 and the movable die assembly 20 is associated with a press ram 3 adapted to move reciprocally toward and away from the stationary die assembly. The press bolster 2 and press ram 3 are parts of standard press equipment which constitute no part of the instant invention but are well-known in the forming art and will not, therefore, be described in detail herein.

The stationary or lower die assembly comprises a die block 4 having a centrally disposed stepped recess defined by concentric cylindrical walls 7, 8 and 12, annular surfaces 9 and 11, and round bottom surface 14. A stepped cylindrical support member 16 rests upon a portion of annular surface 11, the lower cylindrical portion 13 of said support member extending into the recess defined by cylindrical wall 12 of the die block but advantageously being spaced slightly from surface 14 thereof. The support member 16 is suitably secured to die block 4 by machine bolts 18 which are countersunk in die block 4 so that the latter may rest upon the upper and flat surface of press bolster 2 to which it is in turn fixed by machine screws or bolts 22.

Disposed atop annular surface 20 of the support member 16 is a reversible trimming ring 54 having an upper article lip-forming surface 58 and an upper trimming edge 60. In addition, reversible trimming ring 54 includes a lower article lip-forming surface 64 and a lower trimming edge 66 which are, respectively, identical to the upper lip forming surface and trimming edge of the reversible trimming ring. It will readily be seen by virtue of its structure that the reversible trimming ring may be employed with equal facility in the position shown in the drawings or in an inverted position.

Resting upon the inner portion of the reversible trimming ring is a mandrel 30 which is provided with an inwardly indented portion 38 adapted to mate tightly with the reversible ring 54. The lower cylindrical portion of the mandrel 30 extends into the cylindrical recess defined by the inner surface of the trimming ring and inner cylindrical wall 24 of support member 16 but is advantageously spaced slightly from annular surface 26 thereof. Mandrel 30 is suitably provided with an upper article bottom-forming surface 32 having a recess 34. Recess 34 is in open communication with vent lines 86 which extend completely through the mandrel 30, base support member 16 and into and through the side of die block 4 whereby recess 34 can be vented to the atmosphere for a purpose to be hereinafter described. Mandrel 30 is further provided with a generally cylindrical article wall-forming portion 36 which merges at its upper end with surface 32 of the mandrel. A recess 50 in the article bottom-forming surface is in open communication with a central bore through the mandrel defined by cylindrical wall 48.

Mandrel 30 and reversible trimming ring 54 are secured in position in support member 16 by screw jack means generally designated at 68. These screw jack means comprise a shaft 70 having an integral head 72 which is disposed in the recess 50 in mandrel 30. The upper surface of head 72 is suitably notched or otherwise indented to facilitate operation or rotation of the screw jack means 68 by means of a wrench or similar tool (not shown) which can be manually inserted in the notch or indentation from a position above the mandrel. The lower end of shaft 70 is connected to a cylindrical member 78 in any manner suitable to prevent movement of the shaft 70 and the member 78 relative to each other. In the embodiment shown in the drawings, the lower end of shaft 70 is threadedly affixed to a sleeve member 78 with member 78 in turn being threadedly engaged with support 16. Shaft 70 is rigidly locked to sleeve 78 by means of a suitable pin 80.

Since the diameter of element 78 is greater than that of the central bore in mandrel 30 defined by cylindrical wall 48, rotation of the screw jack means 68 in one direction will cause the top surface of element 78 to bear upwardly against the bottom surface of mandrel 30, thereby lifting mandrel 30 out of its secured position in the movable die assemby 10. Rotation of the screw jack means in the opposite direction will cause the shoulders of head 72 to bear downwardly upon the bottom surface of recess 50 of mandrel 30, thereby rigidly securing mandrel 30 and reversible trimming ring 54 in their operating positions as shown in the figures.

When upper trimming edge 60 of reversible trimming ring 54 becomes dull as a result of repeated or continuous operation of the instant die apparatus in the manner hereinafter described, the trimming ring 54 may be quickly and easily inverted in the die assembly 10 by the proper rotation of jack means 68 to first effect a freeing of the mandrel 30 and trimming ring 54 from the die assembly, and then a re-anchoring of the mandrel and ring in the assembly after the latter has been inverted. Inversion of the trimming ring, of course, makes available a fresh and sharp trimming edge 66 to replace the dulled edge 60. When edge 66 also becomes dull, the screw jack means 68 again makes possible simple, quick and easy removal of the trimming ring from the movable die assembly 10 for sharpening or replacement.

Since trimming ring 54 has two trimming edges, the operational service life of this ring is, of course, twice as great as would be the service life of a trimming ring having only one trimming edge. Therefore, a user of the instant die apparatus who maintains a supply of trimming rings, replacing them as they become dull and sharpening dulled edges of replaced rings only after a number of rings with dulled edges have accumulated, finds it possible to reduce by at least one-half the number of trimming rings which must be kept on hand. This, of course, is economically desirable. Further, many sharpening devices commonly used in the trade can sharpen two edges, such as edges 60 and 66, at the same time and with little or no greater difficulty or expense than is involved in sharpening one edge of a trimming ring. Accordingly, a reversible trimming ring, such as ring 54, contributes substantially to both the economy and the convenience of operating and maintaining the instant die apparatus.

Surrounding mandrel 30 and spaced therefrom is a vertically movable draw ring 88 which may move freely into and out of the recess defined by wall 8, the outer cylindrical surfaces of support member 16 and reversible trimming ring 54 and annular surface 11. The draw ring 88 is advantageously biased upwardly in a conventional fashion by means of a plurality of rods 90, only one of which is shown, which pass through die block 4 and press bolster 2 and have their lower ends (not shown) suitably connected to a suitable preloaded spring mechanism by means of which a constant predetermined upward pressure is transmitted to draw ring 88. Thus, the draw ring 88 remains in its uppermost or "at rest" position until such time as the downward vertical pressure against its upper surface is sufficient to overcome the constant upward pressure exerted through the rods 90, at which time the draw ring 88 will be forced downwardly. Draw ring 88 is also provided with a plurality of vertically disposed pins 94 which are adapted to project slightly above the upper surface of the draw ring and which are mounted upon springs 96 which bias the pins 94 in an upwardly direction. The spring-mounted pins 94 act as a scrap ring-releasing mechanism in a manner to be described hereinafter.

In order to limit the extent of its upward travel, draw ring 88 is provided with an annular shoulder 98. This shoulder engages an undersurface of an annular blank-cutting member 100 which is positioned atop surface 9 and secured to die block 4 by means of a plurality of machine screws 102 which are countersunk in blank-cutting member 100.

Blank-cutting member 100 is provided with an annular blank-cutting edge 104 and a frustro-conical wall portion 106. It will be noted that when in an "at rest" position, the top surface of draw ring 88 and blank-cutting edge 104 are generally disposed in a common horizontal plane and are spaced slightly above the top surface of mandrel 30.

Blank-cutting member 100 is further provided with an outer frustro-conical wall 108 which generally conforms to the shape of the inner annular and frustro-conical wall of runout table 110 from which blank-cutting member 100 is spaced slightly. Runout table 110 is supported in spaced relation to blank-cutting member 100 by means of spacer ring 112 but is not fastened to the spacer ring or any other part of the movable die assembly whereby is readily adapted to be lifted away from the die assembly 10. The upper surface of runout table 110 is substantially on the same horizontal plane as the upper surface of draw ring 88 and the blank-cutting edge 104 of blank-cutting member 100, whereby a strip or sheet of metal, such as aluminum 114, may readily be run out over the runout table and past the entire stationary die assembly 10.

It will be noted that all of the various elements of die assembly 10, with the exception of draw ring 88 but including blank-cutting member 100 and trimming ring 54 are adapted to remain stationary during the operation of the apparatus.

The upper and movable die assembly 20 will now be described in detail. The upper die assembly 20 is carried on a vertical reciprocable press ram 3 of any suitable forming press constituting a pressure means for actuating the movable die assembly so as to form a cup-shaped article in a manner to be hereinafter described. The forming press is not shown in detail since it may be of any of a variety of types well-known in the article-forming art.

Secured to press ram 3 by means of machine screws (not shown) is a base plate 118 having a central cylindrical opening 120 through which a shaft 122 extends. The upper end of shaft 122 extends through base plate 118 and the press ram 3 and terminates in a connection (not shown) with a knock-out bar of standard type which merely limits the upward travel of shaft 122. Since the knock-out bar arrangement forms no part of the instant invention, it need not be described nor shown in detail herein. Secured to the lower end of shaft 122 is an article bottom-forming piston 124 having a lower surface 126 adapted to mate and cooperate with the article bottom-forming surface 32 of mandrel 30 to form the bottom of a cup-shaped article in a manner to be described.

Surrounding article bottom-forming piston 124 is a female sleeve-like-forming member 132 which is provided with an inner-cylindrical wall 134 concentric with and spaced from the outer cylindrical wall 136 of forming piston 124 by a distance at least equal to the thickness of the cup-shaped article to be formed. The lower portion 138 of wall portion 134 comprises an article wall-forming portion of female-forming member 132. Below article wall-forming portion 138 and constituting a continuation thereof is an article lip-forming portion 140 which curves smoothly downwardly and outwardly to the lowermost edge of the female-forming member.

Above wall portion 134, female-forming member 132 is provided with an inwardly projecting annular shoulder 142 which overlies forming piston 124. A spacer ring 144 may advantageously be affixed to shoulder 142 by means of countersunk machine screws (not shown).

Vents 130 extend completely through piston 124, spacer ring 144, forming member 132 and into and through the side of base plate 118, whereby the surface 126 of piston 124 is vented to the atmosphere for a purpose to be hereinafter described.

Female-forming member 132 also includes an outer cylindrical wall portion 148 above which is an outwardly curving annular portion 150 which terminates below cylindrical wall portion 152 of the female-forming member. Above cylindrical wall portion 152 is an outwardly extending annular shoulder 154. The upper portion of forming member 132 is provided with a stepped annular surface 156 and an upwardly extending annular ring portion 158 which is spaced when the apparatus is in "at rest" position from the lower and flat surface of base plate 118 by a distance slightly greater than the thickness of the lip of the cup-shaped article to be formed.

Atop annular surface 156 there is disposed a spring means 160 which, since it is disposed between base plate 118 and female-forming member 132, biases the female-forming member downwardly toward the stationary die assembly 10. It has been found that the frusto-conically shaped spring disc washer of conventional design may be advantageously employed for this purpose. Advantageously, an ordinary annular washer 162 may be disposed between spring washer 160 and base plate 118.

The spring washer 160 is preloaded so that in the operation of the instant apparatus, as described hereinafter, it remains in its expanded or compressed state thereby biasing female-forming member 132 downwardly and away from press ram 3 not only during the initial portion of the downward stroke of upper die assembly 20 and before forming piston 124 contacts the strip of metal 114 disposed above mandrel 30 but also after the metal strip is contacted by piston 124 and while the metal strip is being formed into the bottom of a cup-shaped article between the lower surface of the forming piston and the upper surface of mandrel 30. That is, the spring means 160 is preloaded so as to withstand article bottom-forming pressure transmitted from the press ram 3 through base plate 118, washer 162, spring means 160, forming member 132 and spacer 144 to the forming piston 124. The preloading of the spring means 160 is such, however, that the spring washer yields or is substantially compressed after the bottom of a cup-shaped article is formed and the forming piston encounters the resistance of the fixed mandrel thereby subjecting the spring means to pressure in excess of said article bottom-forming pressure.

In other words, the spring means 160 not only biases the female-forming member 132 downwardly toward stationary die assembly 10 but also transmits article bottom-forming pressure to the forming piston 124 from the press ram 3. The spring washer is preloaded so as to withstand article bottom-forming pressure without being compressed but so as to yield and be compressed when subjected to pressure in excess of article bottom-forming pressure.

When the apparatus is in the position shown in FIG. 2, the spring washer 160 being substantially compressed, the annular ring portion 158 of forming member 132 abuts base plate 118 so that pressure from the press ram 3 is transmitted to female-forming member 132 by base plate 118 alone and not by spring washer 160 and washer 162. This structure constitutes a means for relieving the spring washer of excessive pressure or stress at the end of the downward stroke of the instant apparatus thereby preventing an over-stressing or undue fatigue of the spring washer and contributes to a longer and more efficient service life for the spring washer 160.

It is to be noted that the downward travel of the female-forming member 132 is ultimately stopped, as shown in FIG. 2, by shoulder 142 and spacer ring 144 which bear upon the upper surface of forming piston 124. This downward travel is not stopped by the bottoming of the article lip-forming portion 140 of female-forming member 132 on the lip of the cup-shaped article formed between the forming portion 140 and the forming portion 58 of trimming ring 54. On the contrary, the length of wall portion 134 of forming member 132 is such that when the instant apparatus is in the position shown in FIG. 2 the article lip-forming portion 140 is spaced from the upper article lip-forming portion 58 of trimming ring 54 by a distance at least equal to the desired thickness of the lip of the cup-shaped article to be formed. Thus, the stresses incident to the bottoming of the instant die apparatus are distributed over parts of the cup-shaped article formed and the instant die apparatus having relatively large surface areas and are not confined to the relatively small surface areas of the lip of the cup-shaped article formed and article lip-forming portion 140 of the female-forming member.

Surrounding female-forming member 132 at its lower end is a sleeve-like member 164 which is rigidly secured to a coordinate member 166 by fastening means such as screws 168. Coordinate member 166 is rigidly secured at its upper end to base plate 118 by means of screws 170, the heads of which are countersunk in the coordinate member. Thus, it is believed to be apparent that sleeve-like member 164 is rigidly and immovably secured with respect to the press ram 3. The upper portion of coordinate member 166 is offset from the lower portion thereof to provide an inner shoulder 172 and an outer shoulder 174. Inner shoulder 172 limits the extent to which female forming member 132 may be biased toward the stationary die member by the spring washer 160. Outer shoulder 174 provides a convenient place for insertion of screws 170 for securing the coordinate member to base plate 118. In this connection, it will be noted that base plate 118 may advantageously be provided with a central recess defined by cylindrical wall portion 176 whereby the upper portion of coordinate member 166 may advantageously be nested in the base plate 118.

At the spaced points at which screws 168 secure sleeve-like member 164 to coordinate member 166, the latter is provided with openings or windows 180 which are in open communication with both the inner and outer walls of the coordinate member and are also in open communication with openings or cavities disposed immediately above the screws 168. It will be observed that by virtue of these openings or windows and cavities, the heads of screws 168 are readily accessible and the screws may easily be rotated to facilitate removal of sleeve-like member 164 from the apparatus and replacement of the sleeve-like member therein. Further, such removal or replacement can be completed readily without disassembling or removing from the press apparatus the entire upper die assembly 20 or any substantial number of parts of the upper die assembly.

When the apparatus is in the "at rest" position shown in FIG. 1, the upper surface of sleeve-like member 164 intersects the outer cylindrical wall portion 148 of female-forming member 132 at a point below outwardly curving wall portion 150 and the inner cylindrical wall of sleeve-like member 164 is in slidable contact with the outer cylindrical wall portion 148 of the female-forming member. At its lower outer edge, sleeve-like member 164 is provided with an outer annular blank-cutting edge 186 and at its lower inner edge the sleeve-like member is provided with an inner annular trimming edge 188. The presence of both of these edges on a single member 164 makes possible the sharpening of both edges simultaneously by certain sharpening devices. In addition, only one element, namely, sleeve-like member 164, need be removed and replaced when the cutting edges thereof become dull, whereas in the case of a die device having comparable cutting and trimming edges disposed on separate elements, two such elements must be removed for sharpening or replacement purposes from the die assembly with which they are associated. Moreover, the single sleeve-like member 164 may be removed from and replaced in the upper die assembly easily and quickly, as was explained previously herein. Accordingly, the advantages in terms of expense, time and convenience of the structure and arrangement of sleeve-like member 164 are believed to be obvious.

It will be noted that the length of female-forming member 132 is such that while it is biased toward the stationary die assembly by the spring means 160 the lowermost edge of the female-forming member lies in substantially the same horizontal plane as the inner annular trimming edge 188 of the sleeve-like member 164. Thus, these edges remain in substantially the same plane during the major part of the cup-shaped article-forming operation and until the spring washer 160 yields or is substantially compressed, as will be described hereinafter.

Sleeve-like member 164 may also be advantageously provided with a plurality of pins 204 (only one of which is shown) biased slightly outwardly of the surface 185 of the sleeve-like member by springs 206 for a purpose to be hereinafter described.

Surrounding and slightly spaced from the sleeve-like member 164 is a clamping ring 192 which is biased downwardly by suitable compression springs 190. This clamping ring is axially movable with respect to sleeve-like member 164 and is normally held in position by a plurality of bolts 194. As shown in FIG. 1, the heads of these bolts 194 abut against suitable lands 198. Thus, their downward movement, as well as that of clamping ring 192 to which they are connected, is limited.

Having described in detail the components making up the apparatus of the instant invention, the operation thereof will now be described. By comparing FIGS. 1 and 2, it is believed that the various positions assumed by the components of the apparatus during operation thereof will become clear as the description proceeds.

FIG. 1 shows the various components making up the instant invention in their normal "at rest" position, a web of aluminum or aluminum alloy material having been run out over the runout table and the stationary die assembly 10. The forming operation begins when the press ram 3 is actuated and the press ram begins its descent, picking up piston 124 which becomes retracted against spacer ring 144. Downward descent of the press ram 3 forces the clamping ring 192 into engagement with the web 114, clamping the web between the clamping ring and the runout table 110. Because of the fact that the clamping ring bolts 194 move interiorly of the recesses 196 provided in base plate 118, the clamping action of ring 192 against the top surface of the web of metal will be undisturbed despite the continuing downward movement of the movable die assembly, the springs 190 causing the clamping ring 192 to maintain pressure on the web 114.

At the same time at which the clamping ring engages the web 114, sleeve-like member 164 also engages the web along with the lowermost edge of the female-forming member 132. As downward movement of the movable die assembly continues, a disc-like workpiece or blank is cut out of the web 114 by the co-action of outer blank-cutting edge 186 and blank-cutting edge 104. Simultaneously with the cutting of said blank and the beginning of its descent into the stationary die assembly, draw ring 88 commences its descent under pressure from the press ram 3 transmitted to the draw ring through sleeve-like member 164 and that portion of the web which is held between draw ring 88 and sleeve-like member 164. As downward movement of the press ram 3 and movable die assembly 20 continues, the disc-like blank B is pulled against the uppermost parts of the article bottom-forming surface 32 of the mandrel 30 by the female-forming member 132 and the wall of the cup-shaped article is formed between the article wall-forming portions 36 and 138 of the mandrel and female-forming member, respectively.

As this forming takes place and during subsequent forming as well, the blank is gradually pulled out of the engagement of draw ring 88 and sleeve-like member 164 and over the article lip-forming portion 140 of the female-forming member 132. Since the lowermost edge of the female-forming member is biased downwardly by spring washer 160 and is on substantially the same horizontal plane as the trimming edge 188 of the sleeve-like member during the major part of the forming operation, the pulling of the blank over the trimming edge 188 and the lowermost smooth edge of the sleeve member 132 causes no gouging or other injury to the metal of the blank, nor do these edges interfere in any way with the pulling action.

As the downstroke continues and the ridge 126 of the forming piston 124 first contacts that substantially flat portion of the blank which has been pulled over surface 32 of the mandrel 30 and thereafter descends into groove 34 to complete the forming of the recessed bottom of the cup-shaped article, the spring washer 160 is subjected to article bottom-forming pressure, that is, the pressure required to form a portion of the blank into the bottom of the cup-shaped article. By virtue of the preloading of the spring washer, however, it withstands and transmits such pressure to the forming piston and, in addition, continues to bias female-forming member 132 downwardly thereby insuring the continued smooth pulling of metal of the blank across edge 188 and the lowermost edge of member 132 until the cup-shaped article is completely formed.

Air entrapped between the forming piston 124 and the blank during forming of the bottom of the cup-shaped article is driven out through vents 130. Similarly, air entrapped between the blank and mandrel 30 is driven out through vents 86.

As the forming piston and, therefore, the entire forming means comprising the forming piston 124, spacer ring 144 and forming member 132 bottom on mandrel 30, forming of the lip of the cup-shaped article is completed, the lip being finally formed between lip-forming portion 140 of the female-forming member and upper lip-forming surface 58 of the reversible trimming ring 54.

Bottoming of the forming piston atop the mandrel subjects spring washer 160 to pressure in excess of article bottom-forming pressure and the spring yields and is compressed to the extent permitted by the annular ring portion 158 of forming member 132. This yielding of the spring washer permits trimming edge 188 of the sleeve-like member to descend below the lowermost point of female-forming member 132 a distance equal to the distance between the upper surface of ring 158 and the lower surface of base plate 118, that is, a distance slightly greater than the thickness of the cup-shaped article formed. Thus, the trimming edge 188 of the sleeve-like member moves past the trimming edge 60 of the reversible trimming ring 54 thereby trimming the lip of the completely formed cup-shaped article, a scrap ring being left in the engagement of member 164 and draw ring 88.

The downward stroke of the upper die assembly is completed when the lower surface of base plate 118 bottoms on the upper surface of the annular ring portion 158 of forming member 132. Thus, the spring washer 160 and washer 162 are not subjected to the stresses incident to the bottoming of the press ram 3 and the upper die assembly 20. As mentioned heretofore, this prevention of overstressing of the spring washer increases its efficient service life.

It is to be further noted that the edge trimming action described hereinabove results in a trimmed edge for the cup-shaped article, which edge is blunt or, put another way, generally disposed at right angles to the upper and lower surfaces of the lip of the article. Such a blunt edge is the product of the trimming action of cooperating trimming edges in an arrangement which, as in the case of the instant apparatus, allows one trimming edge to move past the other in a direction generally transverse to the upper and lower surfaces of the lip and cannot be produced by means of trimming edges which merely meet each other but do not pass each other, and which, therefore, "pinch" the metal in trimming it. The "pinch" trimmed edge defines, when viewed in cross section, a point and is sharper than the blunt edge. Since such sharper edges tend to gouge into closures with which cup-shaped articles may be associated after their fabrication and tend to gouge into the cup-shaped article itself if the edges thereof are bent, rolled or the like, cup-shaped articles having blunt edges are normally more desirable than those having "pinch" trimmed edges.

Formation of a cup-shaped article having thus been completed, the press ram 3 again moves upwardly lifting the movable die assembly 20 out of engagement with the stationary die assembly 10. Draw ring 88 also moves upwardly to its normal "at rest" position by virtue of its biasing means operative through shafts 90. The completed cup-shaped article remains in the female or movable die assembly as the latter ascends because of the tendency of the metal walls of the newly formed articles to spring slightly outwardly and, therefore, to press against the article wall-forming portion of 138 of female-forming member 132. As the ascent continues and the movable die assembly and the cup-shaped article are lifted free of the stationary die assembly 10, the shaft 122 upon which piston 124 is mounted strikes at its upper end, the knock-out means (not shown) which thereafter limit the upward travel of shaft 122 and piston 124 while the upward travel of the other elements of the movable die assembly continue. This causes the cup-shaped article to be pushed from its position in female-forming member 132 and, therefore, out of engagement with the stationary die assembly.

During the previously described downstroke of the movable die assembly 20 and the formation of a cup-shaped article, the pins 94 and 204 which are mounted on springs which are very weak in relation to all other pressure-exerting means of the instant apparatus are pushed into retracted positions in draw ring 88 and sleeve-like member 164, respectively, and play no part in the forming of the cup-shaped article. As the press ram 3 moves upwardly, however, and pressures tending to depress pins 94 and 204 are relieved, the springs 96 and 206 again expand causing the pins 94 and 204 to move outwardly from the draw ring and sleeve-like member, respectively, thereby loosening the scrap ring and overcoming any tendency of the scrap ring to cling to either the draw ring 88 or the sleeve-like member 164.

It will readily be understood that the retraction of the press ram 3 and the removal of movable die assembly 20 from engagement with stationary die assembly 10 results in a restoration of the various components of the apparatus to the position of rest, as shown in FIG. 1.

Following retraction of the movable die assembly 10 as just described, the completely formed and trimmed cup-shaped article and the scrap ring are removed from between the stationary and the movable die assemblies by any suitable means. Thereafter, the web of metal, such as aluminum, is advanced by suitable intermittent feed means over the runout table and stationary die assembly so that all is in readiness for the succeeding downward stroke of the movable dies assembly.

It is to be noted that only three of the elements of the instant apparatus, namely, sleeve-like member 164, reversible trimming ring 54 and blank-cutting member 100, have cutting or trimming edges which, as a matter of course in the operation of the device, require periodic sharpening or replacement. Furthermore, each of these three elements is readily removable from the apparatus for sharpening or replacement. The manner in which sleeve-like member 164 may be readily removed and the manner in which reversible trimming ring 54 may be readily removed from its assembly have been described heretofore. Removal of blank-cutting member 100 is also very simple, involving only the lifting aside of run-out table 110, removal of spacer ring 112 and rotation of machine screws 102 to permit the lifting out of the member 100 from its normal position in the stationary die assembly 10.

In addition, it will be observed that all of the above-described elements of the instant apparatus which have cutting or trimming edges are stationary with respect to the die assembly with which they are associated, that is, sleeve-like member 164 is stationary with respect to the movable die assembly 20 and blank-cutting member 100 and reversible trimming ring 54 are, of course, stationary in the stationary die assembly 10. Since the movement of the press ram 3 with respect to the press bolster 2 may be relatively tightly controlled in modern conventional forming press structures, this rigid and stationary position of elements having cutting or trimming edges with respect to the die assemblies with which they are associated makes possible the holding of very close tolerances between cooperating cutting and trimming edges thereby making possible the production of cup-shaped articles, the edges of which have been trimmed with great uniformity and precision. Whereas in certain prior art devices, cutting or trimming edges are on elements which move relative to the press ram of press bolster with which they are associated, the allowance of the tolerances necessary necessary to facilitate such relative movement of the elements militates against the holding of close tolerances between cooperating cutting and trimming edges.

Still further, the instant apparatus provides for the trimming of a blunt edge for a cup-shaped article after the article has been completely formed in a manner which permits metal of the blank to be pulled smoothly into position between the forming elements during all phases of the forming operation.

Thus, there has been shown and described a unique die apparatus for continuously fabricating cup-shaped articles from a web of metal, such as aluminum, in a single operating cycle of the apparatus. It is obvious that various changes may be made in the invention thus described without departing from the spirit and scope thereof as defined by the following claims, wherein

What is claimed is:

1. A die apparatus for forming cup-shaped articles comprising a stationary die assembly and a movable die assembly reciprocable toward and away from said stationary die assembly; said stationary die assembly including a reversible trimming ring having identical upper and lower article lip-forming surfaces and trimming edges; a mandrel mounted upon a surface of said trimming ring; said mandrel further comprising an article wall-forming portion located in spaced relationship to said trimming ring and an article bottom-forming surface which merges with said article wall-forming portion; means removably securing said mandrel and said trimming ring in said stationary die assembly; a first draw ring surrounding said mandrel; means biasing said first draw ring toward said movable die assembly; a blank-cutting member having a blank-cutting edge surrounding said first draw ring; said movable die assembly including a sleeve-like member provided with article wall and bottom-forming means which are cooperatively associated with the wall and bottom-forming portions of said mandrel and a second draw ring member surrounding said article wall and bottom-forming means of said sleeve-like member and aligned with said first draw ring member; said second draw ring member having an outer blank-cutting edge adapted to cooperate with the blank-cutting edge of said blank-cutting member during the initial movement of said movable die assembly and an inner trimming edge; means biasing said wall and bottom-forming means toward said stationary die assembly and relative to said second draw ring; said wall and bottom-forming means of said sleeve-like member being of such length that when biased by said biasing means the lowermost edge thereof will be in substantially the same plane as said inner trimming edge of said second draw ring whereby upon the bottoming of said movable die assembly with respect to said stationary die assembly the said inner trimming edge of said second draw ring member will move past the lowermost edge of said sleeve-like member and a trimming edge of said reversible trimming ring so as to trim the lip of said cup-shaped article.

2. A die apparatus as set forth in claim 1 wherein means are provided for relieving said last-mentioned biasing means of excessive pressure after said biasing means have yielded upon the bottoming of said movable die assembly with respect to said fixed die assembly.

3. A die apparatus as set forth in claim 1 wherein each of the draw rings are provided with cup-shaped article ejection means.

4. A die apparatus as set forth in claim 1 wherein the article lip-forming portion of the sleeve-like member is of such a length that it is spaced from the lip-forming portion of the trimming ring by a distance at least equal to the thickness of the lip of the cup-shaped article when the movable die assembly is bottomed in said fixed die assembly.

5. A die apparatus for forming cup-shaped articles comprising a stationary die assembly and a movable die assembly reciprocable toward and away from said stationary die assembly; said stationary die assembly including a reversible trimming ring having identical upper and lower article lip-forming surfaces and trimming edges; a mandrel mounted upon a surface of said trimming ring; said mandrel having an article wall-forming portion located above and in spaced relationship to said trimming ring; an article bottom-forming surface which merges with said article wall-forming portion; means removably securing said mandrel and said trimming ring in said stationary die assembly; a first draw ring surrounding said mandrel; means biasing said first draw ring toward said movable die assembly; a blank-cutting member having a blank-cutting edge surrounding said first draw ring; said movable die assembly comprising an article bottom-forming piston, a female sleeve-like-forming member surrounding said piston and having an article wall-forming portion and a lip-forming portion; a second draw ring surrounding said sleeve-like-forming member; said second draw ring having an outer blank-cutting edge adapted to cooperate with said blank-cutting edge of said blank-cutting member and an inner trimming edge; means biasing said female sleeve-like-forming member toward said stationary die assembly and relative to said second draw ring; said sleeve-like-forming member being of such length that when biased by said biasing means the lowermost edge of said sleeve-like forming member and said inner trimming edge of said second draw ring will normally lie in the same plane whereby upon the bottoming of said movable die assembly relative to said fixed die assembly the inner trimming edge of said second draw ring will move past the lowermost edge of the lip-forming portion of said sleeve-like-forming member and a trimming edge of said reversible trimming ring so as to trim the lip of said cup-shaped article.

6. A die apparatus as set forth in claim 6 wherein the female sleeve-like member is spaced from said forming piston by a distance at least equal to the wall thickness of the cup-shaped article being formed.

7. A die apparatus as set forth in claim 6 wherein means are provided for relieving said last-mentioned biasing means of excessive pressure after said biasing means have yielded upon the bottoming of said movable die assembly with respect to said fixed die assembly.

8. A die apparatus as set forth in claim 6 wherein each of the draw rings is provided with cup-shaped article ejection means.

9. A die apparatus as set forth in claim 6 wherein the article lip-forming portion of the sleeve-like member is of such a length that it is spaced from the lip-forming portion of the trimming ring by a distance at least equal to the thickness of the lip of the cup-shaped article when the movable die assembly is bottomed in said fixed die assembly.

References Cited by the Examiner

UNITED STATES PATENTS

| | | | |
|---|---|---|---|
| 913,841 | 3/1909 | Opsal | 72—347 |
| 2,312,749 | 3/1943 | Bullock | 113—120 |
| 2,985,128 | 5/1961 | Henrickson | 72—328 |

CHARLES W. LANHAM, *Primary Examiner.*

R. J. HERBST, *Assistant Examiner.*